US012747193B2

(12) United States Patent
Aoki et al.

(10) Patent No.: US 12,747,193 B2
(45) Date of Patent: Sep. 29, 2026

(54) EFFLORESCENCE REMOVING CHEMICAL LIQUID

(71) Applicant: DAIICHIKAGAKUKOGYOSHO CO., LTD., Nara (JP)

(72) Inventors: Minoru Aoki, Nara (JP); Eiichi Aoki, Nara (JP)

(73) Assignee: DAIICHIKAGAKUKOGYOSHO CO., LTD., Nara (JP)

( * ) Notice: Subject to any disclaimer, the term of this patent is extended or adjusted under 35 U.S.C. 154(b) by 214 days.

(21) Appl. No.: 18/239,755

(22) Filed: Aug. 30, 2023

(65) Prior Publication Data

US 2023/0406784 A1 Dec. 21, 2023

Related U.S. Application Data

(63) Continuation of application No. PCT/JP2022/010149, filed on Feb. 25, 2022.

(30) Foreign Application Priority Data

Mar. 9, 2021 (JP) ................................ 2021-073673

(51) Int. Cl.
*C04B 41/00* (2006.01)
*C04B 41/53* (2006.01)
*C04B 111/00* (2006.01)

(52) U.S. Cl.
CPC . *C04B 41/5315* (2013.01); *C04B 2111/00017* (2013.01)

(58) Field of Classification Search
CPC ....... C04B 41/5315; C04B 2111/00017; C04B 2111/00456; C04B 41/5016; C04B 41/65; C04B 41/009; C04B 2111/21; C02F 2303/22; C02F 2307/08; C02F 2307/14; C02F 5/105; E03F 9/00
USPC ........................................................ 510/195
See application file for complete search history.

(56) References Cited

FOREIGN PATENT DOCUMENTS

| | | | | |
|---|---|---|---|---|
| JP | S55-75982 A | 6/1980 | | |
| JP | H08-81289 A | 3/1996 | | |
| JP | 2000-87089 A | 3/2000 | | |
| JP | 2018155095 A | * 10/2018 | ................ | E03F 9/00 |
| JP | 2020-152599 A | 9/2020 | | |

OTHER PUBLICATIONS

International Search Report for PCT/JP2022/010149 dated Jun. 28, 2022.
PCT written opinion dated Jun. 28, 2022.

* cited by examiner

*Primary Examiner* — Eisa B Elhilo
(74) *Attorney, Agent, or Firm* — Yokoi & Co., U.S.A.; Toshiyuki Yokoi

(57) ABSTRACT

An efflorescence removing chemical liquid for dissolving and removing an efflorescence that is formed by calcium hydroxide dissolved by rainwater or groundwater, reacted with carbon dioxide gas in the air and adhered to an inside of a pipe, the efflorescence removing chemical liquid including: water; 10% or less of hydrochloric acid by weight with respect to the water; 3.6% or less of glycolic acid by weight with respect to the water; and 5% or less of lactic acid by weight with respect to the water. Thus, it possible to dramatically suppress the irritating odor of hydrochloric acid by the action of lactic acid and it is possible to provide a comfortable working condition without causing mental or physical discomfort to workers.

2 Claims, 1 Drawing Sheet

EFFLORESCENCE REMOVING CHEMICAL LIQUID

CROSS-REFERENCES TO RELATED APPLICATIONS

This application claims the benefit of priority and is a Continuation application of the prior International Patent Application No. PCT/JP2022/010149, with an international filing date of Feb. 25, 2022, which designated the United States, and is related to the Japanese Patent Application No. 2021-073673, filed Mar. 9, 2021, the entire disclosures of all applications are expressly incorporated by reference in their entirety herein.

BACKGROUND OF THE INVENTION

1. Field of the Invention

This invention is for an efflorescence removing chemical liquid. More specifically, a chemical liquid used for gradually dissolving and removing efflorescence adhering to the inside of vertical pipes, etc., built to reduce the speed of discharge of underground water, etc., in the basement of buildings and other structures.

2. Description of Related Art

In the basement of buildings and other structures, calcium hydroxide contained in mortar is dissolved in rainwater or groundwater that penetrates through cracks or joints and reacts with carbon dioxide in the air to form calcium carbonate (hereinafter referred to as "efflorescence"). Efflorescence often adheres to the inside of vertical pipes that facilitate the discharge of effluent, such as groundwater and other substances. Conventionally, a super high-pressure washer or a pipe tool is used for the removal of efflorescence that clogs the removal of groundwater or other types of effluent from the inside of vertical pipes and other pipes.

BRIEF SUMMARY OF THE INVENTION

However, the use of ultra high-pressure washers to remove efflorescence from the inside of pipes as mentioned above not only increases the cost of the cleaning work, but the wastewater from the cleaning process must be treated as industrial waste, and its disposal is extremely complicated, which further increases the cost of the process. Furthermore, when the latter-mentioned pipe tool is used to remove efflorescence in the pipe, the pipe may be damaged by the tool and may result in a costly replacement of the damaged pipe. In addition, depending on how the efflorescence is adhered to the pipe, it may be difficult to reach the location by using a pipe tool.

Furthermore, when the efflorescence is removed using the aforementioned methods, the effluent, such as groundwater, etc., could be discharged all at once due to the rapid removal or penetration of the efflorescence. Sometimes the effluent is discharged all at once, and thus, although rare, the branch joints are damaged by the water pressure when the discharged water rushes into the branch joints below the vertical pipe all at once.

To solve the above problems, the applicant invented Patent Application 2018-71929 (Patent Publication 2018-155095), which resulted in the simplification of on-site efflorescence removal and cost reduction. However, unfortunately, the site of efflorescence removal work is usually located underground with inadequate ventilation. The efflorescence removing chemical liquid contains hydrochloric acid that can dissolve efflorescence efficiently, and although a special formula has been used to suppress the irritating odor of the hydrochloric acid, the odor remains a problem in nearly sealed spaces.

Furthermore, since the chemical liquid contains hydrochloric acid, which is needed to efficiently dissolve the efflorescence, hydrochloric acid at a concentration of 10% or higher is designated as a deleterious substance under Japan's Poisonous and Deleterious Substances Control Act, which means that the effluent generated from dissolving and cleaning efflorescence cannot be easily disposed of underground.

The present invention is based on the following means to solve all of the above problems, namely, the removal of efflorescence by a mixture of water, hydrochloric acid, glycolic acid, and lactic acid as set forth in claim 1.

Furthermore, as stated in claim 2, the efflorescence removing chemical liquid contains hydrochloric acid at 10% or less by weight, glycolic acid at 3.6% or less by weight, and lactic acid at 5% or less by weight, with respect to a specified quantity of water.

BRIEF DESCRIPTION OF THE DRAWINGS

FIG. 1A is a partial cross-sectional diagram in use, whereas FIGS. 1B and 1C are enlarged cross-sectional views of key parts.

DETAILED DESCRIPTION OF THE INVENTION

Advantages of the Invention

The efflorescence removing chemical liquid in the present invention is produced by mixing water, hydrochloric acid, glycolic acid, and lactic acid, enabling a dramatic suppression of the pungent odor of hydrochloric acid through the action of lactic acid, and thus has the remarkable effect of enabling a comfortable working condition without causing mental or physical discomfort to workers even when the efflorescence removing chemical liquid is used in an underground space that is not adequately ventilated, i.e., a nearly sealed space.

Furthermore, since the efflorescence removing chemical liquid in the present invention contains hydrochloric acid at 10% or less by weight, glycolic acid at 3.6% or less by weight, and lactic acid at 5% or less by weight, with respect to a specified quantity of water, the resulting effluent after efflorescence removal is not considered a deleterious substance but a normal substance, and can be mixed with natural wastewater or washing water for washing, etc., which can then be stored onsite and can be easily treated, even at underground sites.

Therefore, the invention has the special feature of being able to provide the market with a chemical liquid that is most suitable for dissolving and removing efflorescence adhering to the inside of pipes, such as vertical pipes, etc., in underground stations where many people congregate or in buildings, etc., where effluent from groundwater, etc., accumulates.

EMBODIMENT OF THE INVENTION

The following is a description of the embodiment of a case in which an efflorescence removing chemical liquid is used in a device for removing and preventing the adherence of efflorescence in a pipe, such as a vertical pipe, etc., in line with the drawings.

Figure 1A:
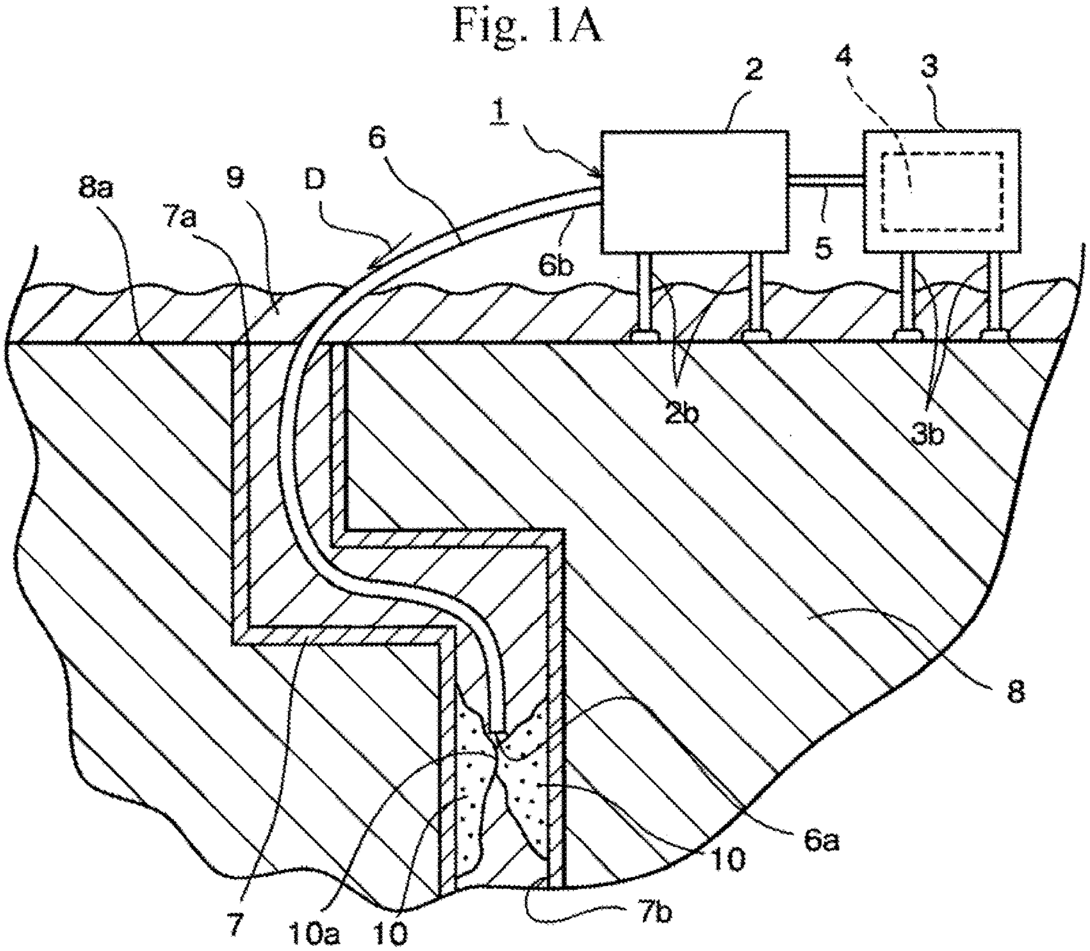
FIGS. 1A to 1C show the embodiment of a device for removing and preventing the adherence of efflorescence in pipes using the efflorescence removing chemical liquid in the present invention.

First, in FIG. 1A, device 1 is an apparatus for removing and preventing the adherence of efflorescence in a pipe. Device 2 is an injection device capable of repeating the process of injecting into pipe 7 and stopping for a predetermined length of time or a predetermined number of times, which is connected via a connection hose 5 to a chemical container 3 containing an efflorescence removing chemical liquid 4 that dissolves efflorescence 10 as described below. The efflorescence removing chemical liquid contained in the chemical container 3 is injected for a specified time into the opening 6*a* of flexible tubing 6, of which the other opening 6*b* is connected to pipe 7.

The efflorescence removing chemical liquid from the inside of pipes 4 in the above-mentioned chemical container 3 is a mixture of hydrochloric acid, water, glycolic acid, and lactic acid that can efficiently dissolve efflorescence 10 and generate reaction bubbles in the form of carbon dioxide and calcium chloride when efflorescence 10 is dissolved. The mixture of hydrochloric acid, glycolic acid, and lactic acid is produced by mixing hydrochloric acid, water, glycolic acid, and lactic acid, at 10% or less by weight, 3.6% or less by weight, and 5% or less by weight, respectively, in a given amount of water.

As a result, it is possible to dramatically suppress the pungent odor of hydrochloric acid by the action of lactic acid, and even when the efflorescence removal chemical is used in an underground space without adequate ventilation, that is, in a nearly sealed space, it is possible to provide a comfortable working condition without causing mental or physical discomfort to workers. In addition, the amount of hydrochloric acid and glycolic acid in the mixture does not exceed 10% by weight of hydrochloric acid and 3.6% by weight of glycolic acid, which allows the treatment of the effluent after efflorescence removal to be stored onsite as an ordinary substance, not as a deleterious substance, as specified in the Poisonous and Deleterious Substances Control Act. Therefore, the effluent after efflorescence removal can be easily treated by mixing it with natural wastewater or washing water, even at an underground site.

The injector 2 and the chemical container 3, which comprise the above-mentioned device for removing and preventing the adherence of efflorescence in pipes 1, for example, are placed on the surface of a concrete floor 8*a* in a station yard or the like, via the legs 2*b* and 3*b*.

Number 7 shows a resin pipe, such as a vertical pipe, etc., embedded in the concrete layer 8 inside concrete floor 8*a*. Number 9 indicates the discharged water, such as groundwater, etc., whose discharge is delayed through the efflorescence-clogged area 10*a* of efflorescence 10 formed in the inner surface portion 7*b* of the pipe 7, and the discharged water 9 is stored inside of the pipe 7 and in the concrete floor 8*a*.

The device for removing and preventing the adherence of efflorescence in pipes 1 using an efflorescence removing chemical liquid in one embodiment of the present invention comprises the above-mentioned configuration, and the following describes the process of removing efflorescence in a pipe such as a vertical pipe by using device 1. First, one end 6*a* of the flexible tubing 6 is fed from the pipe opening 7*a* of the pipe 7 (arrow D), and the flexible tubing 6 is fed until the feeding of the flexible tubing 6 is blocked by the efflorescence-clogged area 10*a* of the efflorescence 10, and then stopped.

Figure 1B:
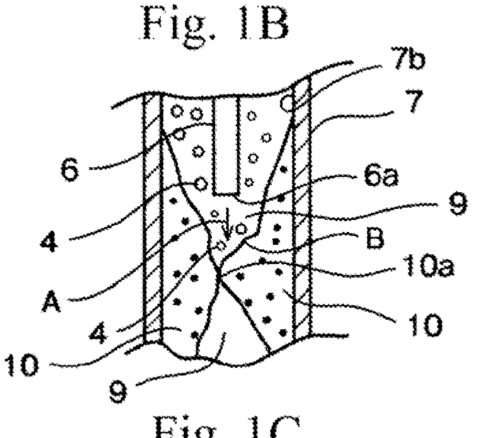
Figure 1C:
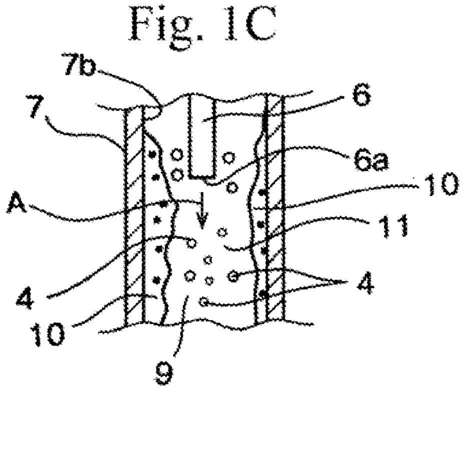

Next, as shown in FIG. 1B, a predetermined amount of efflorescence removing chemical liquid 4 that dissolves the efflorescence 10 and generates reaction bubbles is injected from the other end 6*b* of the flexible tubing 6 through the injection device 2. By repeating the process of injecting the said liquid into the pipe for a predetermined length of time (arrow A) and stopping for a predetermined length of time or a predetermined number of times, the liquid is sequentially injected into the pipe 7 from one end 6*a* of the flexible tubing 6. The efflorescence-clogged area 10*a* of the efflorescence 10 that adheres to the inside of pipe 7 is gradually moved from the vicinity of the one end 6*a* of the flexible tubing 6 in order to slow down the discharged water 9 through both the fixed amount of the efflorescence removing chemical liquid 4 and the reaction bubbles, while dissolving and removing to form a dissolving and removing portion (B), whereas at the end, as shown in FIG. 1C, stagnant effluent 9, the retained effluent such as groundwater, etc., can be discharged reliably.

In short, since effluent 9 such as groundwater, etc., can be discharged by gradually dissolving and removing efflorescence 10 that adheres to the inside of pipe 7 and clogs the flow of effluent 9 from the efflorescence-clogged area 10*a* near one end side 6*a* of flexible tubing 6, the efflorescence removing chemical liquid 4 for efflorescence removal not only directly accesses and gradually dissolves efflorescence 10, but also gradually dissolves and removes efflorescence 10 from adhering to any part of the pipe by moving the reaction bubbles generated when efflorescence 10 is dissolved toward the pipe opening 7*a* of pipe 7, thereby enabling the gradual discharge of effluent 9.

Therefore, the problem of the branch joint being damaged by the water pressure when the clogged effluent 9 is discharged all at once, thus causing effluent 9 to rush into the branch joint below the vertical pipe (not shown in the FIGURE] can be completely solved. Moreover, the system has the remarkable effect of eliminating not only the need for complicated and expensive cleaning work, but also the need for complicated and costly industrial waste treatment of effluent 9. Furthermore, the pipe tool, which carries a high risk of damaging the inside part of the pipe 7 during the removal of efflorescence, is no longer needed at all.

Furthermore, by using this system, in which the efflorescence removing chemical liquid 4 in the present invention is used with the device 1 for removing and preventing the adherence of efflorescence in pipes, for example, by feeding the end 6*a* of the flexible tubing 6 from the pipe opening 7*a* of vertical pipe 7 in a specified length, and then injecting the flexible tubing 6 from the other end 6*b* of said flexible tubing 6 into the pipe for a specified time or a specified number of times in a specified quantity of efflorescence removing chemical liquid, which dissolves the efflorescence 10 and generates reaction bubbles, and stopping the injection for a specified time, such process of injecting a predetermined amount of the efflorescence removing chemical liquid 4, which dissolves efflorescence 10 and generates reaction bubbles, into the pipe for a predetermined period of time and stopping the process for a predetermined number of times is repeated for a predetermined time or number of times, so that the efflorescence removing chemical liquid 4 and reaction bubbles in a prescribed amount injected sequentially from one end 6*a* of the flexible tubing 6 into the inside of the pipe 7 can be used to remove efflorescence 10 from the inside of the pipe 7, the efflorescence removing chemical liquid 4 and the reaction bubbles can directly come into contact with the efflorescence 10 and dissolve it gradually, thus eliminate the need for a super high-pressure washer, and in turn, eliminate the need for complicated and expensive cleaning work. Moreover, the dissolution of the efflorescence also has the remarkable effect of eliminating the need to treat the effluent 9 as industrial waste, which is both complicated and costly, and eliminating the need for pipe tools, which carry the high risk of damaging the inside of pipe 7 during efflorescence removal.

Furthermore, by using this system, in which the efflorescence removing chemical liquid 4 in the present invention is used with the device 1 for removing and preventing the adherence of efflorescence in pipes, for example, the end 6*a* of flexible tubing 6 is fed with a predetermined length from the pipe opening 7*a* of vertical pipe 7, and then the flexible tubing 6 is injected from the other end 6*b* of the flexible tubing 6 into the pipe for a predetermined time or a predetermined number of times in order to dissolve the efflorescence 10 and generate reaction bubbles, the process of injecting a predetermined amount of the efflorescence removing chemical liquid 4, which dissolves efflorescence 10 and generates reaction bubbles, into the pipe for a predetermined period of time and then stopping the process for a predetermined number of times is repeated for a predetermined time or number of times, so that the adherence of efflorescence 10 inside the vertical pipe, etc., is prevented through both a predetermined amount of the efflorescence removing chemical liquid removal 4 and reaction bubbles that are successively injected from one end of the flexible tubing 6*a* into the inside of the pipe 7, it is possible to free pipe 7, which is a vertical pipe or others, used in various places from the adherence of efflorescence 10 by approaching the pipes 7 of buildings such as condominiums, etc., in a predetermined cycle, and hence not limited to the vertical pipes 7 used for effluence 9 such as underground water, etc.

Furthermore, by using this system, in which the efflorescence removing chemical liquid 4 in the present invention is used with the device 1 for removing and preventing the adherence of efflorescence in pipes, since the amount of the efflorescence removing chemical liquid 4 contains a mixture of hydrochloric acid at 10% or less by weight, glycolic acid at 3.6% or less by weight, and lactic acid at 5% or less by weight in a predetermined amount of water, the specific gravity of the efflorescence removing chemical liquid 4 can be adjusted to become heavier than that of the effluent 9, thereby allowing the efflorescence removing chemical liquid 4 to penetrate to the deepest part of the efflorescence-clogged area 10*a* in the efflorescence 10 by gravity, and thus eliminating the need of a costly pressurizing device to apply a pressurized chemical liquid.

Furthermore, by using this system, in which the efflorescence removing chemical liquid 4 in the present invention is used with the device 1 for removing and preventing the adherence of efflorescence in pipes, if the efflorescence removing chemical liquid 4 enters the inside of the pipe 7 as a mist from the end 6*a* of flexible tubing 6, the efflorescence removing chemical liquid 4 can efficiently fill all the area inside vertical pipe 7, and thus the efflorescence 10 adhering to the inside of the pipe 7 can be removed before it caused clogging.

Furthermore, when this system, in which the efflorescence removing chemical liquid 4 in the present invention is used with the device 1 for removing and preventing the adherence of efflorescence in pipes, is used in combination with the injection device 2 capable of repeating the process of injecting the efflorescence removing chemical liquid 4 contained in the chemical container 3 from the end 6*a* of the flexible tube 6 into the pipe for a predetermined time and stopping for a predetermined time, at a predetermined time or at a predetermined frequency, it is possible to automatically remove a blockage in vertical pipe 7 in which effluent 9 such as groundwater is clogged due to adherence of efflorescence 10, without the need for a worker to be on site.

Since the efflorescence removing chemical liquid 4 described in the present invention is produced by mixing water, hydrochloric acid, glycolic acid, and lactic acid, it is possible to dramatically suppress the pungent odor of hydrochloric acid by the action of the lactic acid. In other words, even when it is used in an underground location without adequate ventilation, i.e., in a nearly enclosed space, it is possible to provide a comfortable working condition without causing mental or physical discomfort to workers.

Furthermore, since the efflorescence removing chemical liquid contains hydrochloric acid at 10% or less by weight, glycolic acid at 3.6% or less by weight, and lactic acid at 5% or less by weight in a prescribed amount of water, it is possible to mix the effluent after efflorescence removal with natural wastewater or washing water and store it onsite as a normal substance, not as a deleterious substance. This, in turn, has the exceptional effect that the effluent can be easily treated even at underground sites.

Therefore, by using the efflorescence removing chemical liquid 4, the irritating odor of hydrochloric acid at the time of efflorescence removal can be dramatically suppressed, and the effluent after efflorescence removal can be easily disposed of as normal wastewater. The new product has the exceptional effect of providing the market with an efflorescence removing chemical liquid that is ideal for dissolving and removing efflorescence adhering to the inside of vertical pipes and other pipes that clog the flow of groundwater and other effluent in underground stations, buildings, and other underground areas where not only workers but also many random people gather.

In one embodiment, the efflorescence removing chemical liquid 4 is used with the device 1 for preventing the removal and adherence of efflorescence in a vertical pipe. However, it may also be used, for example, in a horizontal pipe via a branch joint, and in short, if it is intended to remove efflorescence or to prevent it from adhering to the pipe, there is no limitation on the material, shape, arrangement, diameter, type, etc. of the pipe in which the invention is to be used.

INDUSTRIAL APPLICABILITY

The efflorescence removing chemical liquid in the present invention is applicable to all pipes installed where efflorescence occurs.

CODE DESCRIPTION

1: Device for removing and preventing the adherence of efflorescence in pipes
2: Injection device
3: Chemical container
4: Efflorescence removing chemical liquid
5: Connecting hose
6: Flexible tubing
7: Pipe
8: Concrete layer
9: Effluent
10: Efflorescence

What is claimed is:

1. An efflorescence removing chemical liquid, wherein hydrochloric acid, glycolic acid and lactic acid are essential components mixed in a predetermined amount of water, the amount of the hydrochloric acid is 10% or less by weight relative to the predetermined amount of water, the amount of the glycolic acid is 3.6% or less by weight relative to the predetermined amount of water, and the amount of lactic acid is 5% or less by weight relative to the predetermined amount of water.

2. An efflorescence removing chemical liquid applicable to a device for removing an efflorescence and preventing adhesion of the efflorescence inside a pipe, in which a process of injecting the efflorescence removing chemical liquid into the pipe via a flexible tube for a first predetermined length of time and suspending the process for a second predetermined length of time is repeated for a third predetermined length of time or a predetermined number of times, wherein hydrochloric acid, glycolic acid and lactic acid are essential components mixed in a predetermined amount of water in the efflorescence removing chemical liquid, the amount of the hydrochloric acid is 10% or less by weight relative to the predetermined amount of water, the amount of the glycolic acid is 3.6% or less by weight relative to the predetermined amount of water, and the amount of lactic acid is 5% or less by weight relative to the predetermined amount of water.

* * * * *